(12) United States Patent
Berg et al.

(10) Patent No.: US 8,948,692 B2
(45) Date of Patent: Feb. 3, 2015

(54) GRAPHIC NOTIFICATION FEEDBACK FOR INDICATING INDUCTIVE COUPLING AMONGST DEVICES

(75) Inventors: Samantha Berg, San Francisco, CA (US); Kim Lenox, Oakland, CA (US); Robert Brown, Pleasant Hill, CA (US); Vitaly Kruglikov, Palo Alto, CA (US); Manjirnath Chatterjee, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 636 days.

(21) Appl. No.: 13/172,120

(22) Filed: Jun. 29, 2011

(65) Prior Publication Data

US 2012/0202422 A1    Aug. 9, 2012

Related U.S. Application Data

(60) Provisional application No. 61/440,859, filed on Feb. 8, 2011.

(51) Int. Cl.
| | |
|---|---|
| H02J 7/02 | (2006.01) |
| H04B 17/00 | (2006.01) |
| H02J 5/00 | (2006.01) |
| H04B 5/00 | (2006.01) |
| H04M 1/725 | (2006.01) |

(52) U.S. Cl.
CPC ......... H04B 5/0031 (2013.01); H04M 2250/04 (2013.01); H04M 1/7253 (2013.01); H02J 7/025 (2013.01); H04B 17/0065 (2013.01); H02J 5/005 (2013.01); H04B 5/0037 (2013.01)
USPC ......... 455/41.1; 455/41.2; 455/42.3; 455/559

(58) Field of Classification Search
USPC .............................. 455/41.1, 41.2, 41.3, 559
See application file for complete search history.

(56) References Cited

U.S. PATENT DOCUMENTS

| | | | | |
|---|---|---|---|---|
| 5,375,226 | A * | 12/1994 | Sano et al. | 345/169 |
| 5,958,051 | A * | 9/1999 | Renaud et al. | 726/22 |
| 2006/0061324 | A1 | 3/2006 | Oglesbee | |
| 2007/0035917 | A1 | 2/2007 | Hotelling | |
| 2008/0065996 | A1* | 3/2008 | Noel et al. | 715/753 |
| 2008/0226094 | A1* | 9/2008 | Rutschman | 381/79 |

(Continued)

FOREIGN PATENT DOCUMENTS

| | | |
|---|---|---|
| CN | 1204929 A | 1/1999 |
| KR | 10-2008-0036702 A | 4/2008 |

(Continued)

OTHER PUBLICATIONS

ACR122U NFC Contactless Smart Card Reader—URL Transfer, AdvancedCardSystems, Date: Oct. 12, 2010, 1 page, Available at: <youtube.com/watch?v=USImfpCZaTo>.

(Continued)

*Primary Examiner* — Ganiyu A Hanidu
(74) *Attorney, Agent, or Firm* — Mahamedi Paradice LLP (57) ABSTRACT

A computing device is operated to detect a signal generated from an inductive signal interface. The detected signal may be generated by the device's inductive signal interface being in operational proximity to an inductive signal interface of another device. A notification feedback is generated that confirms an event related to the first and second computing device inductively signaling one another.

19 Claims, 5 Drawing Sheets

(56) References Cited

U.S. PATENT DOCUMENTS

| | | | |
|---|---|---|---|
| 2009/0106567 A1 | 4/2009 | Baarman | |
| 2009/0193500 A1 | 7/2009 | Griffin et al. | |
| 2009/0244015 A1* | 10/2009 | Sengupta et al. | 345/173 |
| 2009/0327871 A1* | 12/2009 | Wolf et al. | 715/243 |
| 2010/0073177 A1 | 3/2010 | Azancot et al. | |
| 2010/0081473 A1* | 4/2010 | Chatterjee et al. | 455/559 |
| 2010/0082821 A1* | 4/2010 | Rosenblatt et al. | 709/228 |
| 2010/0174801 A1* | 7/2010 | Tabaaloute | 709/217 |
| 2010/0211785 A1 | 8/2010 | Park et al. | |
| 2010/0302129 A1* | 12/2010 | Kastrup | 345/1.3 |
| 2010/0328225 A1* | 12/2010 | Black | 345/173 |
| 2011/0076941 A1 | 3/2011 | Taveau et al. | |
| 2011/0106954 A1* | 5/2011 | Chatterjee et al. | 709/227 |

FOREIGN PATENT DOCUMENTS

| | | |
|---|---|---|
| KR | 10-0863420 B1 | 10/2008 |
| KR | 10-2010-0136255 A | 12/2010 |
| WO | WO-02/093811 A2 | 11/2002 |
| WO | WO-2008/133806 A1 | 11/2008 |

OTHER PUBLICATIONS

Ian Keen, "NFC Tags Must Offer the Right Balance of Cost and Performance," Innovision Research and Technology Pfc., Date: 2011, pp. 1-3, 2012 Advantage Business Media, Available at: <webcache.googleusercontent.com/search?q=cache. http://www.wirelessdesignmag.com/ShowPR~PUBCODE~055~ACCT~0031760~ISSUE~0704~RELTYPE~PR~PRODCODE~R0190~PRODLETT~A.html>.

Notification Concerning Transmittal of International Preliminary Report on Patentability, International Application No. PCT/US2012/024202, Date of Mailing: Aug. 22, 2013, Date of Issuance: Aug. 13, 2013, pp. 1-6.

Notification Concerning Transmittal of International Preliminary Report on Patentability, International Application No. PCT/US2012/024346, Date of Mailing: Aug. 22, 2013, Date of Issuance: Aug. 13, 2013, pp. 1-6.

* cited by examiner

GRAPHIC NOTIFICATION FEEDBACK FOR INDICATING INDUCTIVE COUPLING AMONGST DEVICES

RELATED APPLICATIONS

This application claims the benefit of priority under 35 U.S.C. 119(e) to Provisional Application Ser. No. 61/440,859, filed Feb. 8, 2011, titled GRAPHIC NOTIFICATION FEEDBACK FOR INDICATING INDUCTIVE COUPLING AMONGST DEVICES, which is incorporated herein by reference in its entirety. This application further hereby incorporates by reference the following U.S. Patent Applications: (i) U.S. Patent Application No. 61/440,858, filed Feb. 8, 2011; (2) U.S. patent application Ser. No. 12/916,388, filed Oct. 29, 2010; and (iii) U.S. patent application Ser. No. 12/620,478, filed Nov. 17, 2009.

TECHNICAL FIELD

The disclosed embodiments relate to graphic notifications for computing devices, and more specifically, to graphic notification feedback for indicating inductive coupling of one device to another.

BACKGROUND

Inductive coupling is increasingly in use on computing devices. Currently, devices such as the PALM PRE (manufactured by the HEWLETT-PACKARD CO.) utilize inductive coupling to dock with docking stations. In addition to signaling power, devices have the capability of signaling data over an inductive channel.

DETAILED DESCRIPTION

Embodiments described herein provide for a computing device that is configured to generate a notification in response to confirming (or not confirming) in event related to two devices coupling or pairing with one another.

In particular, some embodiments provide for a feedback notification that confirms in event related to two devices inductively coupling to one another.

According to one or more embodiments, a computing device is operated to detect a signal generated from an inductive signal interface. The detected signal may be generated by the device's inductive signal interface being in operational proximity to an inductive signal interface of another device. A notification feedback is generated that confirms an event related to the first and second computing device inductively signaling one another.

As used herein, the term "inductive" or "inductively" refers to use of electromagnetism to transfer an electrical signal. An inductive signal transfer uses electromagnetic flux variations or electromagnetic resonance to induce signal transfer. Electromagnetic resonance or evanescent coupling can enable inductive coupling even when the devices that are being coupled are physically separated from one another.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs), and magnetic memory. Computers, terminals, network enabled devices (e.g. mobile devices such as cell phones) are all examples of machines and devices that utilize processors, memory, and instructions stored on computer-readable mediums.

Figure 1:
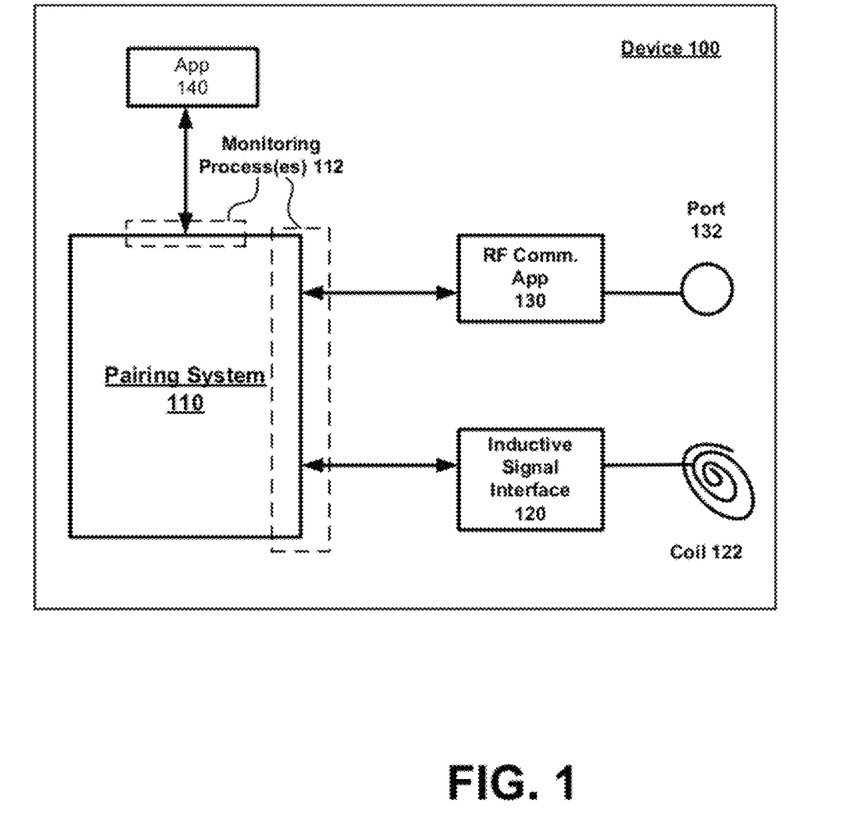
FIG. 1 illustrates a computing device that is configured to provide feedback notifications that confirm events relating to coupling or pairing amongst devices, according to one or more embodiments.

FIG. 1 illustrates a computing device that is configured to provide feedback notifications that confirm events relating to coupling or pairing amongst devices, according to one or more embodiments. The device 100 may correspond to a computing device, such as a multifunctional cellular telephony/messaging device (e.g. smart phone), or a portable computing device such as a notebook or tablet. Embodiments described herein may be implemented on various computing device types and form factors.

With reference to FIG. 1, device 100 includes a pairing system 110, an inductive signal interface 120, a communication application 130, and a library of user applications 140 (e.g. e-mail, phone application, games etc.). The inductive signal interface may utilize one or more coils 122 in order to inductively transmit and/or receive power and/or data. The communication application 130 may interface and/or control and wireless communication port 132. The pairing system 110 may include logic and functionality for enabling device 100 to communicate with other devices. In particular, the pairing system 110 may include logic and functionality that enables device 100 to communicate with other devices in a manner that is automatic, or substantially automatically programmatically implemented. For example, the pairing system 110 may operate to inductively linked computing device 100 with another device that has a compatible inductive signal interface, automatically upon the two devices being brought into operational proximity to one another (for respective coils).

As still another variation, the pairing system 110 may operate to pair the device 100 to one or more other devices using a corresponding local wireless communication medium, such as provided by Bluetooth or Wi-Fi (e.g. Wi-Fi direct). Still further, the pairing system 110 may be configured to enable more advanced sharing functionality, such as sharing application data in response to application events, synchronization, sharing an automated use of data objects, and various other forms of data exchange. In one embodiment, the pairing system 110 uses data exchange over the inductive signal interface 120, in order to securely and automatically establish a communication link with another device using the wireless communication port (as provided by the communication application 130 and the port 132).

According to embodiments, device 100 includes a feedback notification functionality that provides a notification to the user as to the occurrence of one or more advance relating to the device being paired with another device. In one embodiment, the feedback notification functionality is provided by one or more monitoring processes 112 that monitor for parameters and other information about a specific event relating to the device 100 being paired or otherwise couple to another device.

In one embodiment, monitoring process 112 monitors the inductive signal interface 120 for information and parameters relating to the device being inductively couple to another device. The monitoring process 112 may detect occurrences such as the following: (i) inductive signal being received (power or data), (ii) inductive data being transferred in, (iii) data transfer through inductive medium being completed, (iv) inductive coupling encountering a disruption or problem, and/or (v) inductive coupling being performed less than optimally. In one embodiment, the monitoring process detects when inductive data is received through the inductive signal interface 120. The monitoring process may also detect when the coil 122 of the device 100 is properly aligned with the quarrel of the other device in order to transfer power and/or data amongst the two devices. Numerous variations to examples provided may be included with embodiments provided described.

As an addition or alternative, the monitoring process 112 may detect an event relating to or stemming from the device 100 being inductively couple to another device. For example, as described in U.S. patent application Ser. No. 12/916,388, inductive coupling may be used to exchange credential information between the device 100 and another paired device, which in turn is used to establish a secure communication link with other devices over an RF medium. Thus, the inductive pairing may be followed by one or more events that result in communication between the device 100 and another pair device over an RF communication medium. As an alternative or variation, monitoring process 112 may detect occurrence of subsequent events following inductive coupling. For example, the monitoring process 112 may detect completion of the pairing process (e.g. exchange of credential information over an inductive link, followed by establishment of an RF link), as well as use of an RF link. For example, the device 100 can send or receive data over an RF link established through inductive transfer of data.

The monitoring process may similarly monitor use of application data, such as provided by her to applications 140 resident on the device 100. For example, as a result of the pairing process described (e.g. where an RF link is established through inductive exchange of information), the application 140 may transmit or receive a data object (e.g. URL). The transmission or reception of such a data object may be detected as an event by process 112.

Methodology

Figure 2:
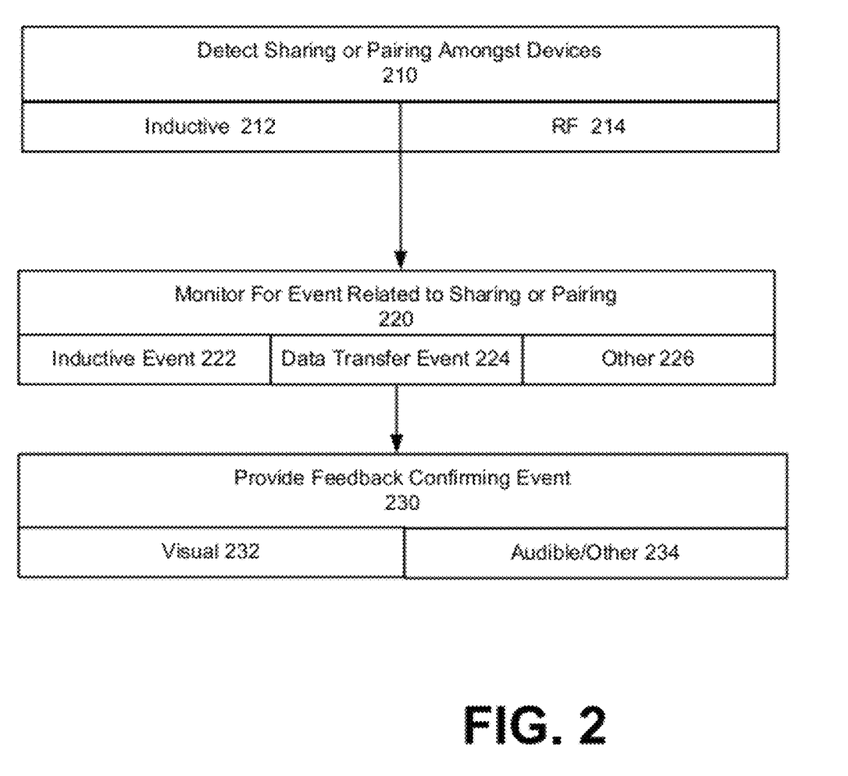
FIG. 2 illustrates a method for providing a feedback notification that confirms the occurrence of an event relating to data sharing or pairing amongst devices, according to one or more embodiments.

FIG. 2 illustrates a method for providing a feedback notification that confirms the occurrence of an event relating to data sharing or pairing amongst devices, according to one or more embodiments. A method of FIG. 2 may be implemented using components such as described by an embodiment of FIG. 1. Accordingly, reference may be made to elements of FIG. 1 for purpose of illustrating suitable components for performing a step or sub step being described.

An embodiment, a device shares information or otherwise pairs with another device (210). Data sharing may be performed amongst devices as a one-time or ad-hoc basis. Alternatively, data pairing operations may be correspond to device 100 establishing, or participating in a persistent or long-term relationship with another device (e.g. one that lasts for multiple communication sessions). For example, as described with some embodiments, devices may generate link keys to communicate with one another over a local wireless communication medium, and the generation of the link keys may be based on credential information that is exchanged inductively. In such implementations, devices may use link keys to connect and reconnect repeatedly to a specific device.

In one embodiment, the data sharing or paring follows an inductive transfer of data (212), such as the exchange of credential information. In another embodiment, data sharing or paring establishment of an RF connection with another device, or exchange of data with another device over an RF communication medium (214).

As part of data sharing or paring, the device 100 may implement processes for monitoring events related to the data sharing or pairing (22). In some embodiments, the event(s) that is monitored is inductive (222). For example, in one embodiment, the event that is monitored corresponds to that device receiving data indicating a proper inductive link with another device. Conditions for determining that the inductive link is proper may correspond to the coil 122 of the inductive signal interface 120 being aligned or placed over or next to the coil of another device.

As an addition or alternative, the monitored event corresponds to a data transfer event that follows determination the two devices are linked or otherwise paired (224). For example, the monitored event may correspond to the device 100 successfully transferring (or receiving) application data or objects to another device following a sequence where the two devices are inductively coupled, then paired across a local wireless communication medium.

Other events may alternatively be detected that relate to the data sharing or pairing event. For example, the event may correspond to a type of communication exchanged between the two devices (e.g. secure versus unsecure) or a type of data.

Embodiments provide that feedback notification is provided following the detected event (230). The feedback notifications may be provided visually (232), such as by graphics or illumination (See e.g. FIG. 3A, FIG. 3B and FIG. 4). Alternatively, the feedback notifications may be provided audibly (234), or still further, through motion such as vibration. The feedback notifications may confirm the occurrence of an event that is expected as a result of the device sharing or pairing with another device.

For example, if device 100 inductively couples to another device to inductively exchange information, the successful positioning of the coils of the respective inductive signal interfaces may result in a confirmation feedback notification being presented to the user. Still further, the confirmation feedback notification may be timed to coincide with the actual transfer, or even completion of information through the inductive communication medium. As another variation, the confirmation feedback notification may be timed to coincide with the establishment of a local wireless communication link with a paired device, which may follow the use of the inductive link. Numerous other variations are possible. For example, the confirmation feedback notification may be generated to signify the establishment of a new pairing with another device, for use in ongoing or persistent communications across multiple communication sessions.

Usage Examples

Figure 3A:
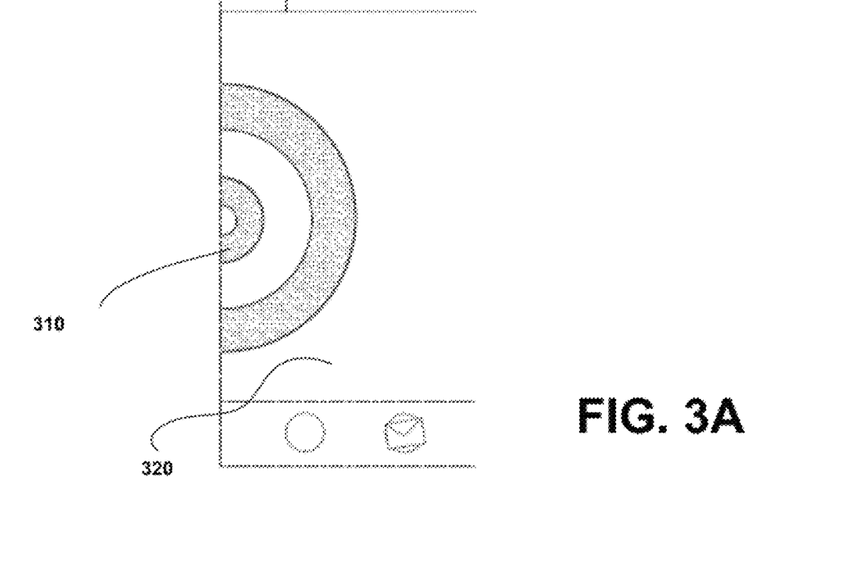
FIG. 3A and FIG. 3B illustrate an example of a confirmation feedback notification, generated in accordance with one or more embodiments.
Figure 3B:
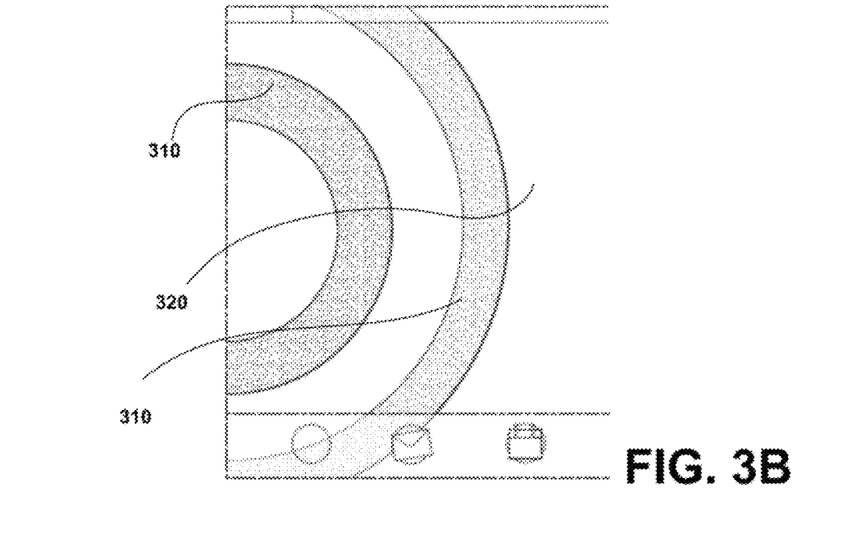

FIG. 3A and FIG. 3B illustrate an example of a confirmation feedback notification, generated in accordance with one or more embodiments. In an embodiment, the confirmation feedback notification is visual and dynamic. More specifically, the confirmation feedback notification emulates a wave or ripple, in that it propagates across a display screen. For example, FIG. 3A illustrates the wave 310 being initiated on a display screen 320 at a start time. FIG. 3B illustrates the same wave 310 propagating across a display screen 320 and a different time. Among other benefits such a feedback notification can be timed to last for more than the duration of the event that is monitored for completion. Thus, for example, if the computing device 100 is configured to generate the confirmation feedback notification in response to an inductive pairing being initiated, the presence of the wave 310 propagating ensures that they inductive pairing will be complete before the notification is terminated. Thus, the user can receive confirmation that the inductive pairing was initiated (e.g. devices are properly place against one other), as well as confirmation that the inductive pairing was complete, using a visual feature that is dynamic and inherent to the perception of time passage.

Figure 4:
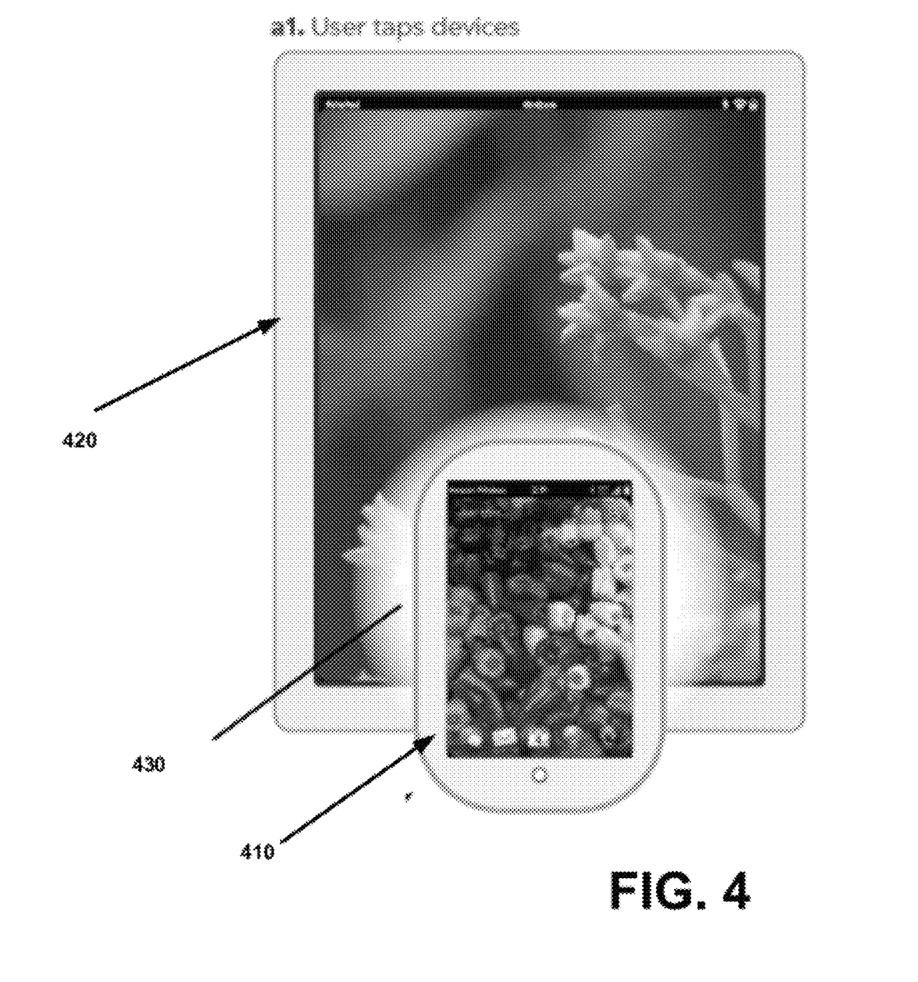
FIG. 4 illustrates a usage example for an embodiment, in which two devices are inductively coupled.

FIG. 4 illustrates a usage example for an embodiment, in which two devices are inductively coupled. In the example provided, a mobile device 410 is inductively coupled to a tablet device 420. Each device may include an inductive signal interface positioned to receive the inductive signal interface of another device. The mobile device 410 may position is inductive signal interface on a rear façade. The tablet 420 may position its inductive signal interface on a promoter region of his front façade. To effectuate an inductive coupling, the user must bring the two devices in close proximity to or in contact with another, so that the coils of each of the respective inductive signal interfaces are aligned to make contact.

Embodiments recognize that while inductive coupling provides an easy and secure transmission medium, its connectorless nature can be offsetting to some users. A user cannot rely on physical structures such as connectors in order to decipher that a connection is made. Additionally, inductive coupling can sometimes require the alignment of coils in order for the inductive coupling to take place. The coil position, as mentioned, can sometimes be occluded to the user, resulting in the user misaligned the coils.

With such consideration in mind, embodiment provide a confirmation notification feature that is indicative of the coils for the two devices being properly aligned. Absent such confirmation notification, for example, the user may second-guess his positioning of the mobile device 410 against the tablet 420. Furthermore, the user may have little awareness the data is being transferred, absent some sensory feedback.

In FIG. 4, the confirmation notification feature is provided as a halo 430, which can be dynamic. As an alternative or variation, the confirmation notification may be provided as a wave or a ripple.

In the example provided, only one device need show the confirmation feedback notification 430. This device may be selected to be the one receiving the data, or the device that is of a particular class or type (e.g. tablet). In variations, both devices may display the confirmation notification.

Hardware Diagram

Figure 5:
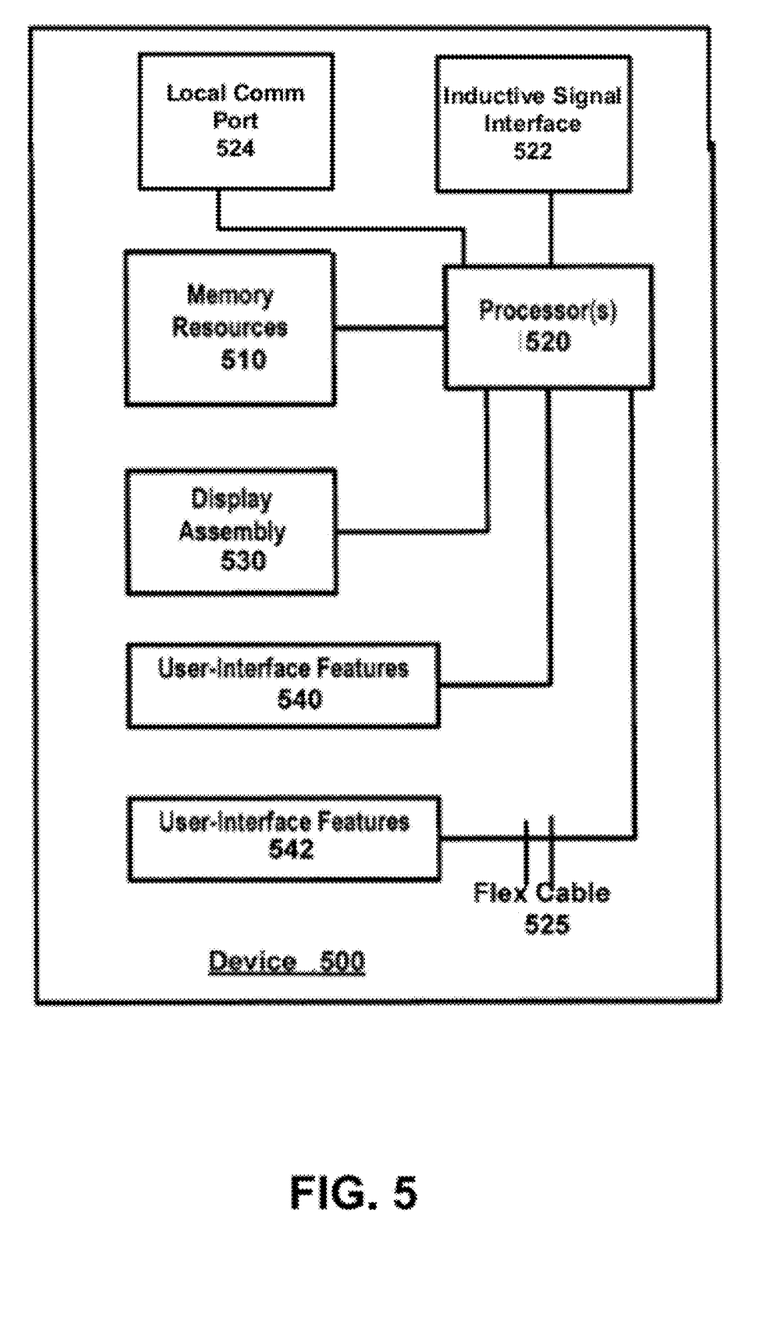
FIG. 5 is a hardware diagram of a device for use with any of the embodiments described herein.

FIG. 5 is a hardware diagram of a device for use with any of the embodiments described herein. A device 500 may correspond to any of the devices illustrated with preceding embodiments. The device 500 may include memory resources 510, one or more processors 520, a display assembly 530, and various user-interface features 540, 542. Additionally, according to some embodiments such as described above, the device 500 may include an inductive signal interface 522 and one or more communication ports 524 (including wireless communication ports). In one embodiment, at least some of the user-interface features 540, 542 (e.g. keyboard or keypad) may be separated so as to be in a different housing segment from the one or more processors 520. A flex cable 525 may be used to interconnect the separated input/output interfaces 542 from the processors 520 and/or other components. However, in other embodiments, any of the internal components and devices, including one of multiple processors, may be distributed between the two housing segments.

Exterior portions of the display assembly 530 can form part of the device housing. The one or more processors are capable of generating or detecting input from soft-interface features that are provided with the display assembly 530. The soft-user interface features may be provided as computer-generated features in connection with operation of the display assembly 530, or alternatively, as fixed features. As mentioned with prior embodiments and/or soft-user interface features may operate with touch, contact or light sensors (e.g. capacitive sensors).

As described with prior embodiments, the processor 520 may execute operations to monitor occurrence of events related to the computing device performing data sharing operations or pairing. The sharing/pairing operations may be performed using the inductive signal interface 522 and/or the local communication port 524. Confirmation notifications may be generated from the processor and presented to the user by way of the display assembly 530 and/or the user interface features 540, 542.

It is contemplated for embodiments described herein to extend to individual elements and concepts described herein, independently of other concepts, ideas or systems, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for operating a first computing device, the method comprising:
    detecting a signal generated from an inductive signal interface provided on a front facade of the first computing device, the signal being generated by the inductive signal interface being in operational proximity to an inductive signal interface provided on a rear facade of a second computing device; and
    dynamically presenting a graphic notification feature, on a display of the first computing device, that confirms an event related to the first and second computing devices inductively signaling one another, the graphic notification feature being dynamically presented on different regions of the display for a duration of time.

2. The method of claim 1, wherein the event corresponds to the first and second computing devices being inductively coupled to exchange at least one of power or data.

3. The method of claim 1, wherein the event corresponds to a coil of the inductive signal interface of each of the first and second computing devices being in sufficient alignment.

4. The method of claim 2, wherein the graphic notification feature is dynamically presented concurrently with the exchange.

5. The method of claim 2, wherein the graphic notification feature is dynamically presented upon completion of the exchange.

6. The method of claim 1, wherein the graphic notification feature corresponds to a ripple or a wave.

7. The method of claim 1, wherein the event corresponds to the first and second computing devices exchanging data inductively in order to establish a local wireless radio-frequency link.

8. The method of claim 1, wherein the event corresponds to the first and second computing devices (i) exchanging data inductively in order to establish a local wireless radio-frequency link, then (ii) communicating information to one another using the local wireless radio-frequency link.

9. A first computing device comprising:
    an inductive signal interface provided on a front facade of the first computing device;
    a display screen;
    one or more processors coupled to the inductive signal interface and the display screen; and
    a memory storing instructions that, when executed by the one or more processors, cause the first computing device to perform operations comprising:
        detect a signal generated from the inductive signal interface as a result of the inductive signal interface being in operational proximity to an inductive signal interface of a second computing device, wherein the inductive signal interface of the second computing device is provided on a rear facade of the second computing device; and
        dynamically present a graphic notification feature, on the display screen, that confirms an event related to the first and second computing devices being in operational proximity to inductively signal one another, the graphic notification feature being dynamically presented on different regions of the display screen for a duration of time.

10. The first computing device of claim 9, wherein the graphic notification feature corresponds to a ripple or a wave.

11. The first computing device of claim 9, wherein the inductive signal interface of the first computing device comprises one or more coils, and wherein the event corresponds to the one or more coils being sufficiently aligned to one or more coils of the second computing device.

12. The first computing device of claim 9, wherein the inductive signal interface of both the first computing device and the second computing device comprises one or more coils, and wherein the event corresponds to the one or more coils of both the first computing device and the second computing device being properly aligned.

13. The first computing device of claim 9, further comprising:
    a local wireless radio-frequency communication port; and
    wherein the event corresponds to the first computing device exchanging data with the second computing device using the local wireless radio-frequency communication port.

14. The first computing device of claim 9, wherein the first computing device is a mobile computing device.

15. The first computing device of claim 9, wherein the first computing device is a tablet.

16. A non-transitory computer-readable medium storing instructions that, when executed by a processor of a first computing device, cause the first computing device to perform operations comprising:
    detecting a signal generated from an inductive signal interface provided on a front facade of the first computing device, the signal generated by the inductive signal interface being in operational proximity to an inductive signal interface provided on a rear facade of a second computing device; and
    dynamically presenting a graphic notification feature, on a display of the first computing device, that confirms an event related to the first and second computing devices inductively signaling one another, the graphic notification feature being dynamically presented on different regions of the display for a duration of time.

17. The non-transitory computer-readable medium of claim 16, wherein the event corresponds to the first and second computing devices being inductively coupled to exchange at least one of power or data.

18. The non-transitory computer-readable medium of claim 17, wherein the graphic notification feature is dynamically presented concurrently with the exchange of data or upon completion of the exchange.

19. The non-transitory computer-readable medium of claim 16, wherein the graphic notification feature corresponds to a ripple or a wave.

\* \* \* \* \*